United States Patent
Karri et al.

(10) Patent No.: US 11,343,415 B1
(45) Date of Patent: May 24, 2022

(54) MULTI-CAMERA ALIGNMENT IN A ROLLABLE DISPLAY DEVICE

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/202,541

(22) Filed: Mar. 16, 2021

(51) Int. Cl.
*H04N 5/225* (2006.01)
*G06F 1/16* (2006.01)
(Continued)

(52) U.S. Cl.
CPC ....... *H04N 5/22525* (2018.08); *G06F 1/1605* (2013.01); *G06F 1/1686* (2013.01); *H04N 5/2258* (2013.01); *H04N 5/23222* (2013.01); *H04N 5/23299* (2018.08); *H04N 5/247* (2013.01); *G06F 1/1652* (2013.01)

(58) Field of Classification Search
CPC ......... H04N 5/22525; H04N 5/225251; H04N 5/2251–2259; H04N 5/23222; H04N 5/2328–23287; H04N 5/23293–232945; H04N 5/23299; H04N 5/247;
(Continued)

(56) References Cited

U.S. PATENT DOCUMENTS

| 2012/0002096 A1* | 1/2012 | Choi | H04N 5/2258 348/E5.025 |
| 2014/0049463 A1* | 2/2014 | Seo | G06F 1/1694 345/156 |

(Continued)

FOREIGN PATENT DOCUMENTS

| CN | 108076292 A | * | 5/2018 | ........... G06F 3/1423 |
| CN | 107820014 A | | 7/2020 | |
| CN | 111405117 A | * | 7/2020 | |

OTHER PUBLICATIONS

Johnston, "Microfluidics panel could add physical buttons to a touch screen", Ars Technica, Jan. 23, 2014, 4 Pages https://arstechnica.com/gadgets/2014/01/new-microfluidics-panel-could-add-physical-buttons-to-a-touch-screen/.

(Continued)

*Primary Examiner* — Paul M Berardesca
(74) *Attorney, Agent, or Firm* — Robert D. Bean

(57) ABSTRACT

According to one embodiment, a method, computer system, and computer program product for operating a flexible device equipped with one or more cameras to visually capture a target area is provided. The present invention may include identifying a bending profile and a holding pattern of a flexible device, and individually aligning one or more cameras of the flexible device to visually capture a target area designated by a user based on the bending profile and the holding pattern of the flexible device. The present invention may further include identifying one or more of the flexible device's cameras as compromised based on visual quality falling below a threshold, and disabling the compromised devices or recommending a new holding pattern or new bending profile to a user that would allow the cameras to capture the target area.

20 Claims, 6 Drawing Sheets

(51) Int. Cl.
*H04N 5/232* (2006.01)
*H04N 5/247* (2006.01)

(58) Field of Classification Search
CPC .... G06F 1/1605; G06F 1/1652; G06F 1/1686; H04M 1/0268
See application file for complete search history.

(56) References Cited

U.S. PATENT DOCUMENTS

| | | |
|---|---|---|
| 2014/0285476 A1 | 9/2014 | Cho |
| 2016/0301832 A1* | 10/2016 | Xu ............ H04N 5/232 |
| 2017/0094168 A1 | 3/2017 | Kang |
| 2017/0212607 A1 | 7/2017 | Yoon |
| 2019/0361501 A1 | 11/2019 | Park |
| 2022/0057980 A1* | 2/2022 | Adoni ............ G06F 3/16 |

OTHER PUBLICATIONS

Lets Go Digital, "Samsung Rollable Display Device with Fingerprint Sensor", Dec. 30, 2017, 6 Pages https://en.letsgodigital.org/foldable-devices/samsung-rollable-tablet-display/.

The OLED Experts, "Rollable OLEDs: introduction and market status", Feb. 7, 2019, 9 Pages https://www.oled-info.com/rollable-oleds.

Mell et al., "The NIST Definition of Cloud Computing", Recommendations of the National Institute of Standards and Technology, NIST Special Publication 800-145, Sep. 2011, 7 pages.

* cited by examiner

MULTI-CAMERA ALIGNMENT IN A ROLLABLE DISPLAY DEVICE

BACKGROUND

The present invention relates, generally, to the field of computing, and more particularly to flexible devices.

Cellular phones and other mobile computing devices have reached an incredible level of technological advancement; as a result, the industry has reached a point where improvements are growing smaller and more iterative. As such, there exists a need in the art for bold new innovations to revitalize the technological advancement of mobile computing devices. One such direction in which innovation is being sought is the field of flexible display devices; flexible display devices are simply electronic display devices capable of displaying dynamic digital images that are designed to be bent. Some devices have integrated hinges that allow the device to be folded at specific points, while others aspire to mimic the properties of paper. These flexible display devices promise to offer radical improvements in durability, portability, convenience, et cetera.

SUMMARY

According to one embodiment, a method, computer system, and computer program product for operating a flexible device equipped with one or more cameras to visually capture a target area is provided. The present invention may include identifying a bending profile and a holding pattern of a flexible device, and individually aligning one or more cameras of the flexible device to visually capture a target area designated by a user based on the bending profile and the holding pattern of the flexible device. The present invention may further include identifying one or more of the flexible device's cameras as compromised based on visual quality falling below a threshold, and disabling the compromised devices or recommending a new holding pattern or new bending profile to a user that would allow the cameras to capture the target area.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
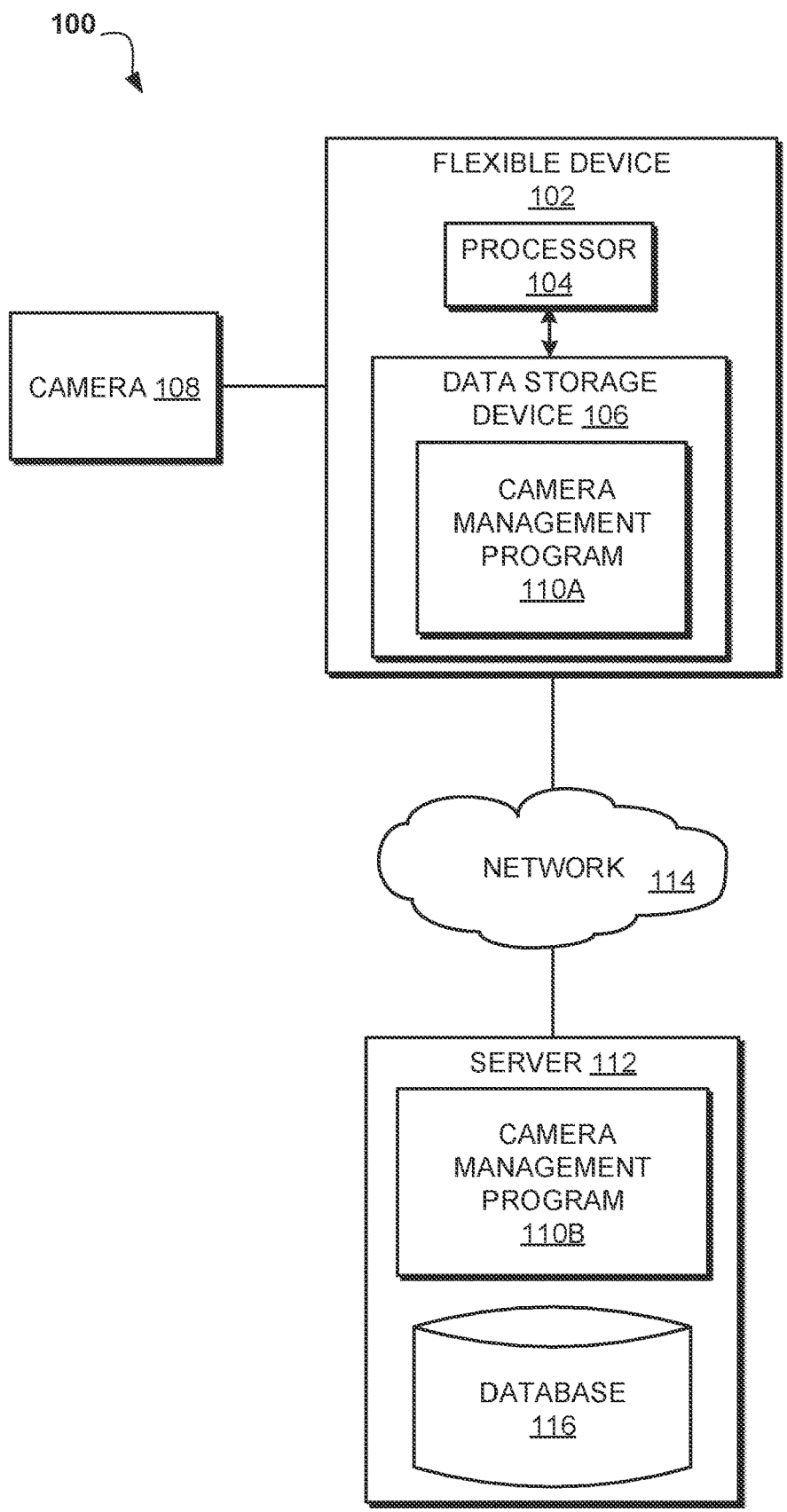
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to flexible devices. The following described exemplary embodiments provide a system, method, and program product to, among other things, dynamically monitor and adapt to the bend profile and holding pattern of a flexible device to maintain coverage of integrated cameras. Therefore, the present embodiment has the capacity to improve the technical field of flexible devices by enabling the flexible device to maintain a consistent level of quality in recorded videos and photographs even where the bend profile or holding pattern of the device results in the obstruction or misalignment of cameras embedded in the device.

As previously described, cellular phones and other mobile computing devices have reached an incredible level of technological advancement; as a result, the industry has reached a point where improvements are growing smaller and more iterative. As such, there exists a need in the art for bold new innovations to revitalize the technological advancement of mobile computing devices. One such direction in which innovation is being sought is the field of flexible display devices; flexible display devices are simply electronic display devices capable of displaying dynamic digital images that are designed to be bent. Some devices have integrated hinges that allow the device to be folded at specific points, while others aspire to mimic the properties of paper. These flexible display devices promise to offer radical improvements in durability, portability, convenience, et cetera.

Flexible display devices can be folded, rolled, or bent in various ways according to the user's need. In some implementations, the overall dimension of the flexible display is comparatively larger, so that when the device is bent or folded, the dimensions can be reduced, and as per user's need can then be restored by un-bending the device. For example, a user may bend a flexible device at its midpoint into a 45-degree angle so that the device may be rested upright on a surface, halving the display dimensions. However, the introduction of flexibility to a display device introduces challenges that must be overcome before the potential of the flexible display device can be fully realized. In particular, the issue that bending a device may result in the occlusion or repositioning of cameras integrated into the flexible device such that the quality of video recording or photography is significantly degraded. As such, it may be advantageous to, among other things, implement a system that dynamically tracks the bending profile of a flexible device in relation to the position of cameras integrated into the device, and takes measures to mitigate or eliminate any adverse effect the bending profile may produce in the videos or photographs recorded by the flexible device.

According to one embodiment, the invention is an apparatus comprising a flexible device equipped with one or more integrated cameras, where each camera is integrated with a microfluidics-enabled surface capable of repositioning the camera to improve the coverage and/or visual quality of captured images based on the bending profile of the flexible device.

According to at least one embodiment, the invention is a method of dynamically tracking the bending profile and holding pattern of the flexible device and altering properties of cameras integrated into the flexible device to maintain visual coverage and quality.

In some embodiments, the target area may be any visual region designated for capture by the user which the user may desire to record in a photograph or video, for instance an expansive landscape, a majestic building, a birthday party, et cetera. The user may communicate the target area to the system via the user interface of the flexible device, for example by manipulating a preview of the target region displayed graphically on a display integrated into the flexible device, changing the alignment, position, and/or direction of the preview until it depicts the desired target area, and confirming that the preview represents the target area. In some embodiments, the user may indicate an object or person that the user desires to be the subject of the video or photograph, for example using the preview graphically represented via flexible device 102, hand gestures, and/or voice commands, and the system may identify a target area based on and including the indicated object or person. In some embodiments of the invention, the subject encompassed by the target area may a moving object, such as a train, or a person; in such embodiments, the target area may change over time to correspond with the motion of the subject.

In some embodiments, the bending profile may be a description of the position or form that the flexible device currently occupies, and in some embodiments may include the assumed direction of the user relative to the flexible device. In some embodiments, the bending profile may include the position of the cameras on the flexible device and/or relative to the user and/or relative to the ground or other obstacles that could affect visual quality and/or coverage. In some embodiments, the flexible device may use image processing to identify portions of the flexible device visible within images recorded by the cameras, and thereby identify the shape, or bend profile, of the flexible device. In some embodiments, the flexible device may be equipped with any combination of sensors, such as piezoelectric sensors, mechanical switches, strain gauges, et cetera, to measure the shape of the device and by extension the bend profile.

In some embodiments, the holding pattern may describe the support elements in contact with or otherwise supporting the flexible device at any given moment; the support elements may primarily include the fingers or hands of the user as she grips the flexible device, but in some embodiments may include, for example, tables that the flexible device is lying on or walls or objects that flexible device is propped up against, car holders or pockets, et cetera. The system may determine the position of support elements using object detection on video feeds from the cameras and/or pressure sensors integrated into the surface of the flexible device. In some embodiments, the flexible device may use capacitance to identify the presence and position of skin against the surface of the flexible device and thereby identify the position of the user's fingers and hands.

In some embodiments the system may analyze images being captured by the flexible device to dynamically assess visual quality. The visual quality may be a measure of the accuracy with which the cameras capture and display the signals that form an image, and/or may be a weighted combination of visually significant attributes of an image. Visually significant attributes of the image may be any image attributes that contribute to the aesthetic merit of an image, such as sharpening, noise, dynamic range, tone reproduction, contrast, color accuracy, distortion, lens flare, artifacts, chromatic aberration, et cetera. In some embodiments, the visual quality may reflect whether or not the camera is occluded by objects in the foreground, for example the fingers of a user or rolled portions of the flexible device, such that the camera's field of view is wholly or partially obstructed.

In some embodiments, the system may, based on the bending profile of the display, visual quality, and/or holding pattern, identify cameras that are compromised; compromised cameras may be cameras that are visually occluded such that the camera cannot capture the target area, and/or cameras which are otherwise moved by the bending of the device and/or the device's location relative to the target area into positions where the camera cannot capture the target area and/or where the camera is exposed to conditions that degrade the visual quality of the recorded image, for instance strong direct or reflected light sources that create glare or lens flare. Cameras may be identified as compromised for example where occlusion is detected in images recorded by the camera and/or inferred from the bending profile and/or holding pattern, and/or where visual quality falls below a threshold level of visual quality, where the threshold level of visual quality represents the level of visual quality below which the image is considered too degraded to be worth capturing. In some embodiments, a threshold of visual quality may be set for one or more individual cameras of the flexible device, and may be set respective to an average or default visual quality associated with the specific camera, such that the threshold represents a discrete amount of degradation from an average or default visual quality associated with the camera. The threshold of visual quality may be set by the user to reflect the user's preferences, and/or may be based on feedback crowdsourced from focus groups, social media, individuals in similar demographics to the user, et cetera. The system may deactivate compromised cameras and record through non-compromised cameras instead, where non-compromised cameras may be cameras that have not been significantly compromised by the bending profile of the flexible device such that the visual quality of their images falls below the threshold level of visual quality.

In some embodiments, for example where one or more cameras are compromised but one or more cameras are not compromised, the system may deactivate one or more of the compromised cameras and capture the target area using the one or more non-compromised cameras.

In some embodiments, for example where one or more cameras are compromised, the system may suggest a new holding pattern and/or new bending profile to the user. The system may identify one or more new bending profiles and/or new holding patterns for the flexible device that would be suitable for capturing the target area. The system may retrieve bending profiles and/or holding patterns corresponding with a given target area from a database or repository. The system may graphically illustrate the new bending profile and/or new holding pattern to the user on a display connected with the flexible device, for instance through a video, slideshow, or diagram instructing the user on how to position and hold the flexible device. In some embodiments, the system may recommend a new bending profile and/or new holding pattern responsive to determining that some or all cameras are compromised, and/or that the current bending profile of the flexible device does not allow the cameras to capture the target area, and/or that the individual or aggregate visual quality of the cameras does not meet or exceed the threshold of visual quality, and/or that one or more of the cameras are occluded by the current holding pattern.

In some embodiments, the system may align the cameras to capture the target area. The system may measure the distance to the target area from each camera, and may measure the direction of focus for each camera. While the distance between the cameras may be fixed on the surface of flexible device, the relative position of the cameras with respect to each other may change as the surface of flexible device flexes or folds; the system may measure this relative position of the cameras in determining how to align the cameras to capture the target area. The system may align the cameras based on for example the distance to the target area and/or direction of focus for some or each of the cameras, the relative distance between at least one pair of cameras, the aggregate visual quality of the captured image, et cetera to produce an image of the entire target area. In some embodiments, the system may capture the same or similar images of the target area with multiple cameras and choose the image with the highest visual quality, and/or may coordinate the cameras to capture at least one aggregate image of the target area composited together from multiple cameras such that while an individual camera may be capturing only a portion of the target area, the combined coverage of the cameras extends to the entire target area. In some embodiments, for example where the target area is moving, or where the flexible device is moving with respect to the target area, the system may dynamically align the cameras at short intervals, for example every half second or every second, to acquire and maintain real time or near-real-time capture of the target area.

In some embodiments, for example where the system identifies one or more cameras as compromised as a result of factors related to the cameras' positions or alignments, the system may, based on the bending profile, activate microfluidics mechanisms corresponding to one or more compromised cameras to reposition the compromised cameras into orientations relative to the flexible device and/or the target area and/or conditions or obstacles in the nearby environment such that the cameras are no longer compromised, and/or no longer fall below the threshold of visual quality.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to dynamically monitor and adapt to the bend profile and holding pattern of a flexible device to maintain coverage of integrated cameras.

Referring to FIG. 1, an exemplary networked computer environment 100 is depicted, according to at least one embodiment. The networked computer environment 100 may include flexible device 102 and a server 112 interconnected via a communication network 114. According to at least one implementation, the networked computer environment 100 may include a plurality of flexible devices 102, cameras 108, and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Flexible device 102 may include a processor 104 and a data storage device 106 that is enabled to host and run a camera management program 110A and communicate with the server 112 via the communication network 114, in accordance with one embodiment of the invention. Flexible device 102 may be, for example, a mobile device, a telephone, a personal digital assistant, a netbook, a laptop computer, a tablet computer, a desktop computer, or any type of computing device capable of running a program and accessing a network. Flexible device 102 may comprise or be operatively connected with cameras 108. As will be discussed with reference to FIG. 5, the flexible device 102 may include internal components 502a and external components 504a, respectively. In some embodiments, flexible device 102 may be flexible; flexible device 102, or components of flexible device 102, may be capable of bending, rolling, or flexing between two or more forms, for instance by the use of hinges, or by flexible materials used in the construction of flexible device 102. In some embodiments, flexible device 102 may be operatively connected to one or more devices that are flexible, for instance to a bendable or hinged display.

Cameras 108 may be any optical instruments capable of recording images and transmitting recorded images to camera management program 110A, 110B. Cameras 108 may be integrated into or otherwise operatively connected with flexible device 102; at least one camera 108 may be embedded into a flexible surface of flexible device 102. One or more cameras 108 may be mounted on or otherwise integrated with a microfluidics surface, such that the facing, position, height, alignment, et cetera of cameras 108 may be dynamically adjusted by the microfluidics mechanism comprising the microfluidics surface. One or more cameras 108 may be equipped with a magnetic chip, compass, accelerometer, or other such device to identify the orientation of the cameras 108 relative to each other, flexible device 102, and/or a target area.

The server computer 112 may be a laptop computer, netbook computer, personal computer (PC), a desktop computer, or any programmable electronic device or any network of programmable electronic devices capable of hosting and running a camera management program 110B and a database 116 and communicating with the flexible device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the camera management program 110A, 110B may be a program enabled to dynamically monitor and adapt to the bend profile and holding pattern of a flexible device to maintain coverage of integrated cameras. The camera management 110A, 110B may be located on flexible device 102 or server 112 or on any other device located within network 114. Furthermore, camera management 110A, 110B may be distributed in its operation over multiple devices, such as flexible device 102 and server 112. The camera management method is explained in further detail below with respect to FIG. 2.

Figure 2:
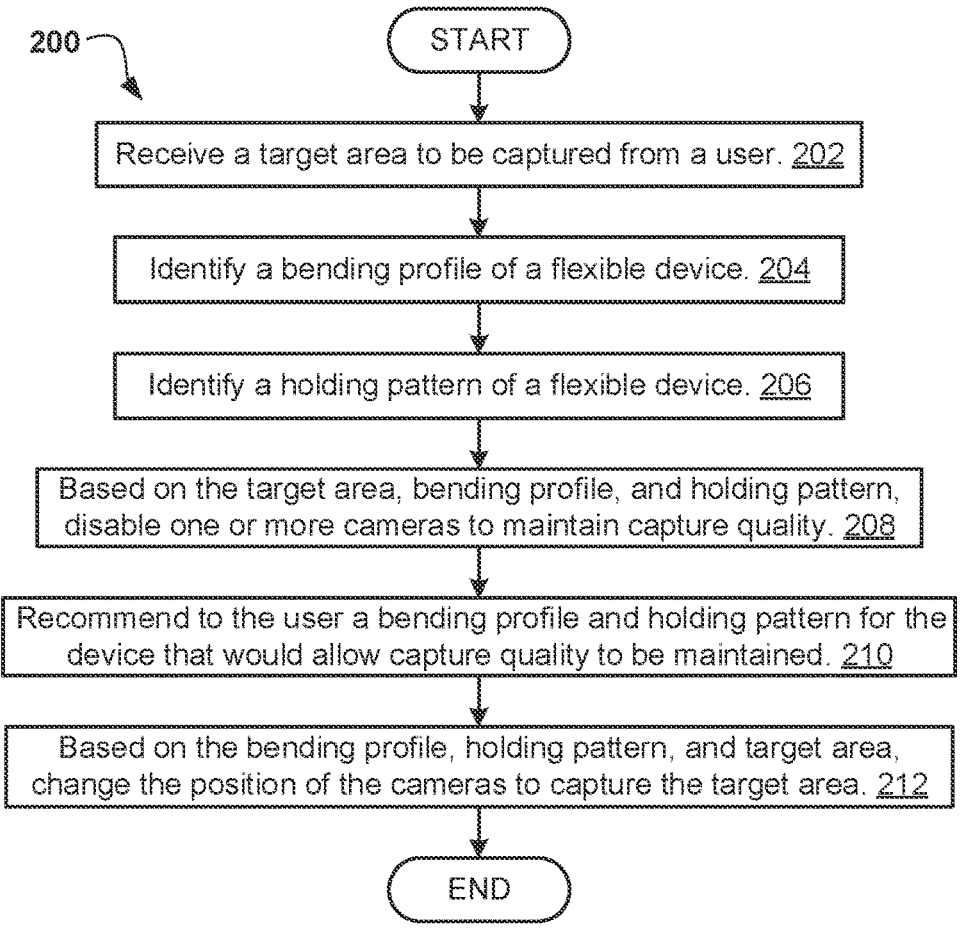
FIG. 2 is an operational flowchart illustrating a camera management process according to at least one embodiment.

Referring now to FIG. 2, an operational flowchart illustrating a camera management process 200 is depicted according to at least one embodiment. At 202, the camera management program 110A, 110B receives a target area to be captured from a user. The target area may be any visual region designated for capture by the user which the user may desire to record in a photograph or video, for instance an expansive landscape, a majestic building, a birthday party, et cetera. The user may communicate the target area to camera management program 110A, 110B via flexible device 102, for example by manipulating a preview of the target region displayed graphically via flexible device 102, changing the alignment, position, and/or direction of the preview until it depicts the desired target area, and confirming to camera management program 110A, 110B that the preview represents the target area. In some embodiments, the user may indicate an object or person that the user desires to be the subject of the video or photograph, for example using the preview graphically represented via flexible device 102, hand gestures, and/or voice commands, and camera management program 110A, 110B may identify a target area based on and including the indicated object or person. In some embodiments of the invention, the subject encompassed by the target area may a moving object, such as a train, or a person; in such embodiments, the target area may change over time to correspond with the motion of the subject.

At 204, camera management program 110A, 110B identifies a bending profile of the flexible device 102. The bending profile may be a description of the position or form that the flexible device 102 currently occupies. The camera management program 110A, 110B may identify the bending profile through any number or combination of means; for example where the flexible device 102 includes both speakers and microphones, the speakers may emit sound waves, such as an ultrasonic wave, and analyzing the return of the emitted sound wave to identify the shape, or bend profile, of the flexible device. In some embodiments, the flexible device may be equipped with any combination of sensors, such as piezoelectric sensors, mechanical switches, electrical resistance sensors, electrical contacts, strain gauges, et cetera, to measure flexion and/or hinged movement of the flexible device 102 and interpret the sensor data to identify the current shape and/or position of flexible device 102, and by extension the bend profile. In some embodiments, camera management program 110A, 110B may employ object detection methods to identify visual portions of the flexible device 102 within the camera feed from one or more cameras 108 to extrapolate a bend profile based on the location of the camera 108 on flexible device 102. In some embodiments, flexible device sound management program 110A, 110B may dynamically monitor the bend profile of the flexible device 102 in real time or short intervals (for example, every half second) approximating real time.

At 206, camera management program 110A, 110B identifies a holding pattern of a flexible device. The holding pattern may describe the support elements in contact with or otherwise supporting the flexible device 102 at any given moment; the support elements may primarily include the fingers or hands of the user as she grips the flexible device 102, but in some embodiments may include, for example, tables that the flexible device 102 is lying on or walls or objects that flexible device is propped up against, car holders or pockets, et cetera. The camera management program 110A, 110B may determine the position of support elements using object detection on video feeds from the cameras 108 and/or pressure sensors integrated into the surface of the flexible device 102. In some embodiments, the flexible device 102 may use capacitance to identify the presence and position of skin against the surface of the flexible device 102 and thereby identify the position of the user's fingers and hands.

At 208, based on the target area, bending profile, and holding pattern, camera management program 110A, 110B disables one or more cameras to maintain capture quality. In some embodiments camera management program 110A, 110B may analyze images being captured by the flexible device 102 to dynamically assess visual quality. The visual quality may be a measure of the accuracy with which the cameras 108 capture and display the signals that form an image, and/or may be a weighted combination of visually significant attributes of an image. The visual quality may reflect whether or not a camera 108 is occluded by objects in the foreground, for example the fingers of a user or rolled portions of the flexible device 102, such that the field of view of the camera 108 is wholly or partially obstructed; the camera management program 110A, 110B may determine whether a camera 108 is occluded by analyzing the bending profile and the holding pattern to determine if a portion of flexible device 102 or support elements respectively are positioned so as to block all or a portion of the visual arc of the camera 108. The camera management program 110A, 110B may alternatively or additionally use object recognition to identify support elements or flexible device 102 within the visual arc of the camera 108. In some embodiments, the camera management program 110A, 110B may identify cameras 108 as compromised; camera management program 110A, 110B may identify a camera 108 as compromised if the camera 108 cannot be oriented to record any or enough of the target area, or is wholly or partially occluded such that the camera 108 cannot capture the target area. and/or is positioned where the camera 108 is exposed to conditions that degrade the visual quality of the recorded image, for instance strong direct or reflected light sources that create glare or lens flare.

In some embodiments, camera management program 110A, 110B may identify cameras 108 as compromised where visual quality falls below a threshold level of visual quality, where the threshold level of visual quality represents the level of visual quality below which the image is considered too degraded to be worth capturing. In some embodiments, a threshold of visual quality may be assessed for each of one or more individual cameras 108 integrated with or operatively connected with the flexible device 102, and/or may be assessed in the aggregate, representing a combined visual quality of the composite image formed from the feeds of multiple cameras 108. The user may set the threshold of visual quality to reflect the user's preferences, and/or camera management program 110A, 110B may determine the threshold of visual quality based on feedback crowdsourced from focus groups, social media, individuals in similar demographics to the user, et cetera. The camera management program 110A, 110B may deactivate compromised cameras 108 and record the target area through non-compromised cameras 108, where non-compromised cameras 108 may be cameras 108 that have not been significantly compromised by the bending profile of the flexible device 102 such that the visual quality of their images falls below the threshold level of visual quality.

At 210, camera management program 110A, 110B recommends to the user a bending profile and holding pattern for the device that would allow capture quality to be maintained. The camera management program 110A, 110B may identify one or more new bending profiles and/or new holding patterns for flexible device 102 that would be more suitable for capturing the target area than the bending profile that the flexible device 102 is currently in, and/or the holding pattern with which the flexible device 102 is currently being supported. The camera management program 110A, 110B may retrieve new bending profiles and/or new holding patterns corresponding with a given target area from a database or repository. The camera management program 110A, 110B may graphically illustrate the new bending profile and/or new holding pattern to the user on a display connected with flexible device 102, for instance through a video, slideshow, or diagram instructing the user on how to position and hold the flexible device 102. In some embodiments, the camera management program 110A, 110B may recommend a new bending profile and/or new holding pattern responsive to determining that some or all cameras 108 are compromised, and/or that the current bending profile of the flexible device 102 does not allow cameras 108 to capture the target area, and/or that the individual or aggregate visual quality of cameras 108 does not meet or exceed the threshold of visual quality, and/or that one or more cameras 108 are occluded by the current holding pattern.

At 212, based on the bending profile, holding pattern, and target area, camera management program 110A, 110B changes the position of the cameras to capture the target area. The camera management program 110A, 110B may measure the distance to the target area from each camera 108, and may measure the direction of focus for each camera 108. While the distance between the cameras 108 may be fixed on the surface of flexible device 102, the relative position of the cameras 108 with respect to each other may change as the surface of flexible device 102 flexes or folds; camera management program 110A, 110B may measure this relative position of the cameras 108 in determining how to align the cameras 108 to capture the target area. The camera management program 110A, 110B may align the cameras 108 based on for example the distance to the target area and/or direction of focus for some or each of the cameras 108, the relative distance between at least one pair of cameras 108, the aggregate visual quality of the captured image, et cetera to produce an image of the entire target area. In some embodiments, the camera management program 110A, 110B may capture the same or similar images of the target area with multiple cameras 108 and choose the image with the highest visual quality, and/or may coordinate the cameras 108 to capture at least one aggregate image of the target area composited together from multiple cameras 108 such that while an individual camera 108 may be capturing only a portion of the target area, the combined coverage of the cameras 108 extends to the entire target area. In some embodiments, for example where the target area is moving, or where the flexible device 102 is moving with respect to the target area, camera management program 110A, 110B may dynamically align the cameras 108 at short intervals, for example every half second or every second, to acquire and maintain real time or near-real-time capture of the target area.

Figure 3:
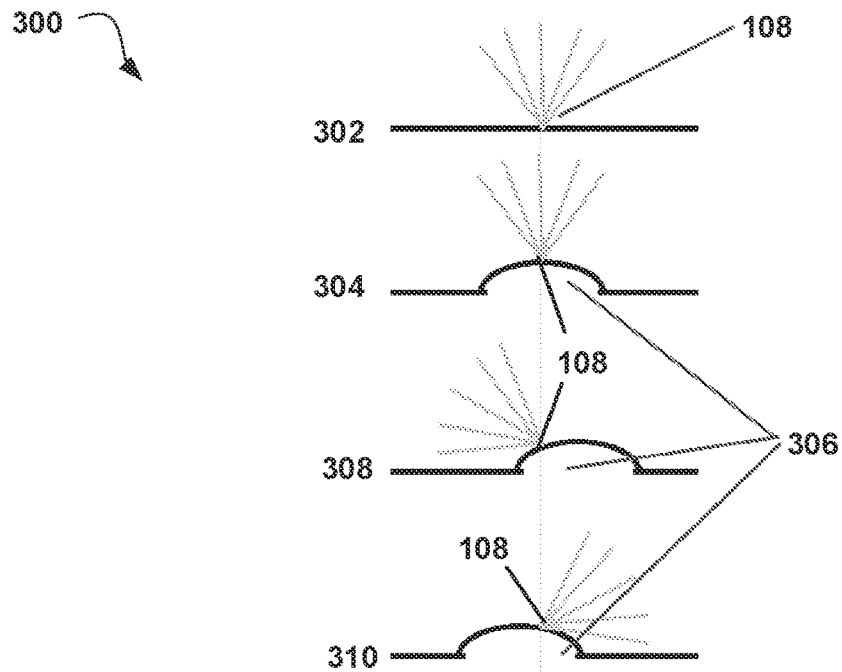
FIG. 3 illustrates an exemplary implementation of microfluidics mechanisms within a flexible device according to at least one embodiment.

Referring now to FIG. 3, an exemplary implementation 300 of microfluidics mechanisms 306 within a flexible device 102 is depicted according to at least one embodiment. Here, a flexible device 102 is equipped with a camera 108 which is embedded upon a microfluidics surface. At 302, the microfluidics surface is not engaged, and the camera 108 is facing straight up. At 304, the microfluidics surface is engaged to create a bubble 306 which is centered under camera 108 and repositions camera 108 above the surface of flexible device 102. At 308, the microfluidics surface is engaged to create a microfluidics bubble 306 which is off-center to the right of camera 108, such that camera 108 is situated on the left side of microfluidics bubble 306 and its visual arc, or the cone emanating from the lens of the camera 108 that describes the visual region that camera 108 may record, is angled to the left. At 310, the microfluidics surface is engaged to create a microfluidics bubble 306 which is off-center to the left of camera 108, such that camera 108 is situated on the right side of microfluidics bubble 306 and its visual arc is angled to the right. Based on the location of microfluidics bubble 306 relative to camera 108, camera 108 may be angled to record in any direction. The size of the microfluidics bubble 306 may also be changed to alter the elevation or angle of the camera 108.

Figure 4A:
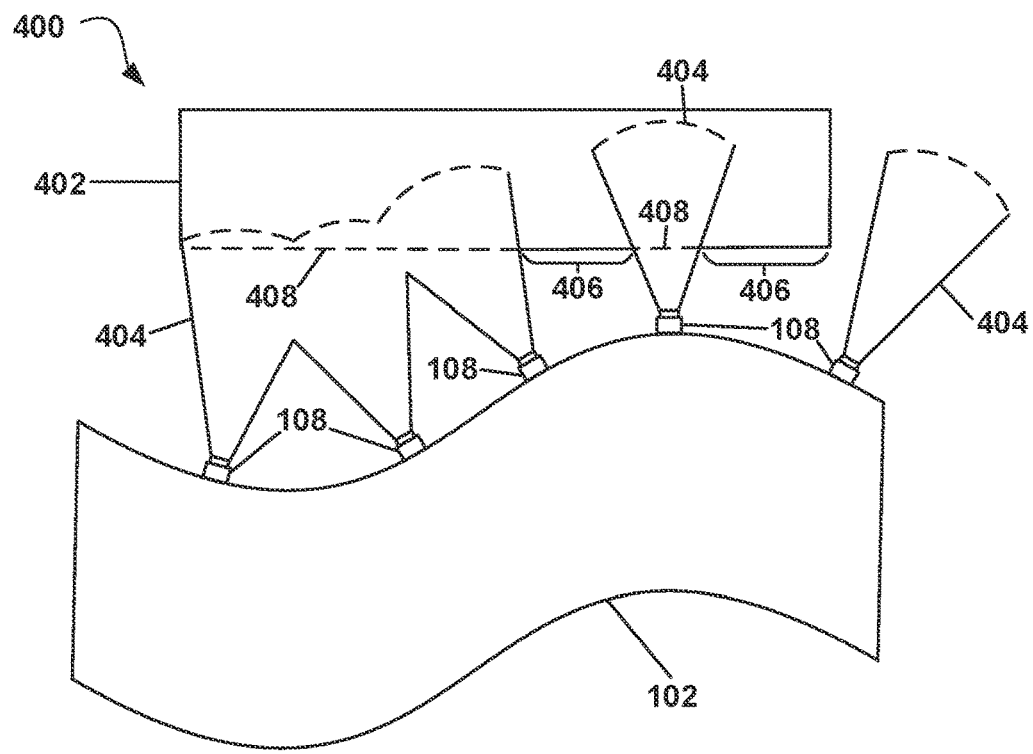
FIG. 4A is a top-down diagram depicting an exemplary system implementing a camera management process prior to performing camera alignment according to at least one embodiment.

Referring now to FIG. 4A, a top-down diagram of an exemplary system 400 implementing camera management process 200 prior to aligning cameras 108 is depicted according to at least one embodiment. Here, a flexible device 102 is equipped with five cameras 108 on a flexible surface. The user has designated a target area 402; however, the cameras 108 are misaligned such that their collective visual arcs 404 capture only a portion 408 of target area 402, resulting in gaps 406 which represent regions of target area 402 that are not visible to any of the cameras 108.

Figure 4B:
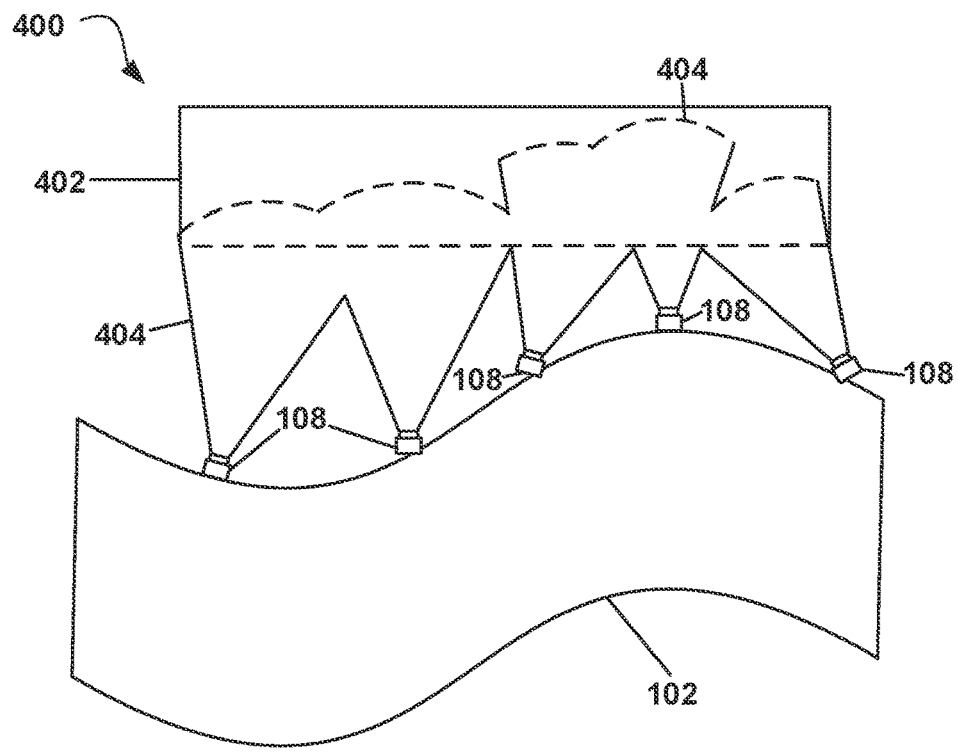
FIG. 4B is a top-down diagram depicting an exemplary system implementing a camera management process after performing camera alignment according to at least one embodiment.

Referring now to FIG. 4B, a top-down diagram of an exemplary system 400 implementing camera management process 200 after aligning cameras 108 is depicted according to at least one embodiment. Here, camera management program 110A, 110B has aligned cameras 108 in coordination with each other such that while no individual camera 108 captures all of target area 402, the visual arcs 404 of all five cameras 108 collectively encompass the entirety of target area 402.

It may be appreciated that FIGS. 2-4 provide only illustrations of implementations and do not imply any limitations with regard to how different embodiments may be implemented. Many modifications to the depicted environments may be made based on design and implementation requirements. For example, while cameras 108 are described herein with respect to visual light, one skilled in the art would recognize that embodiments may employ cameras 108 recording images outside of the visual spectrum; in such embodiments, visual quality may be assessed based on accuracy rather than aesthetic merit, and the threshold of visual quality may likewise be tied to accuracy. Furthermore, while flexible device 102 is herein described as having multiple cameras 108, one skilled in the art would recognize that embodiments of the described system may employ only one camera 108; in such embodiments, camera management program 110A, 110B may, for example, determine whether the camera 108 is compromised, and if it is, may suggest a holding pattern and/or bending profile to the user.

Figure 5:
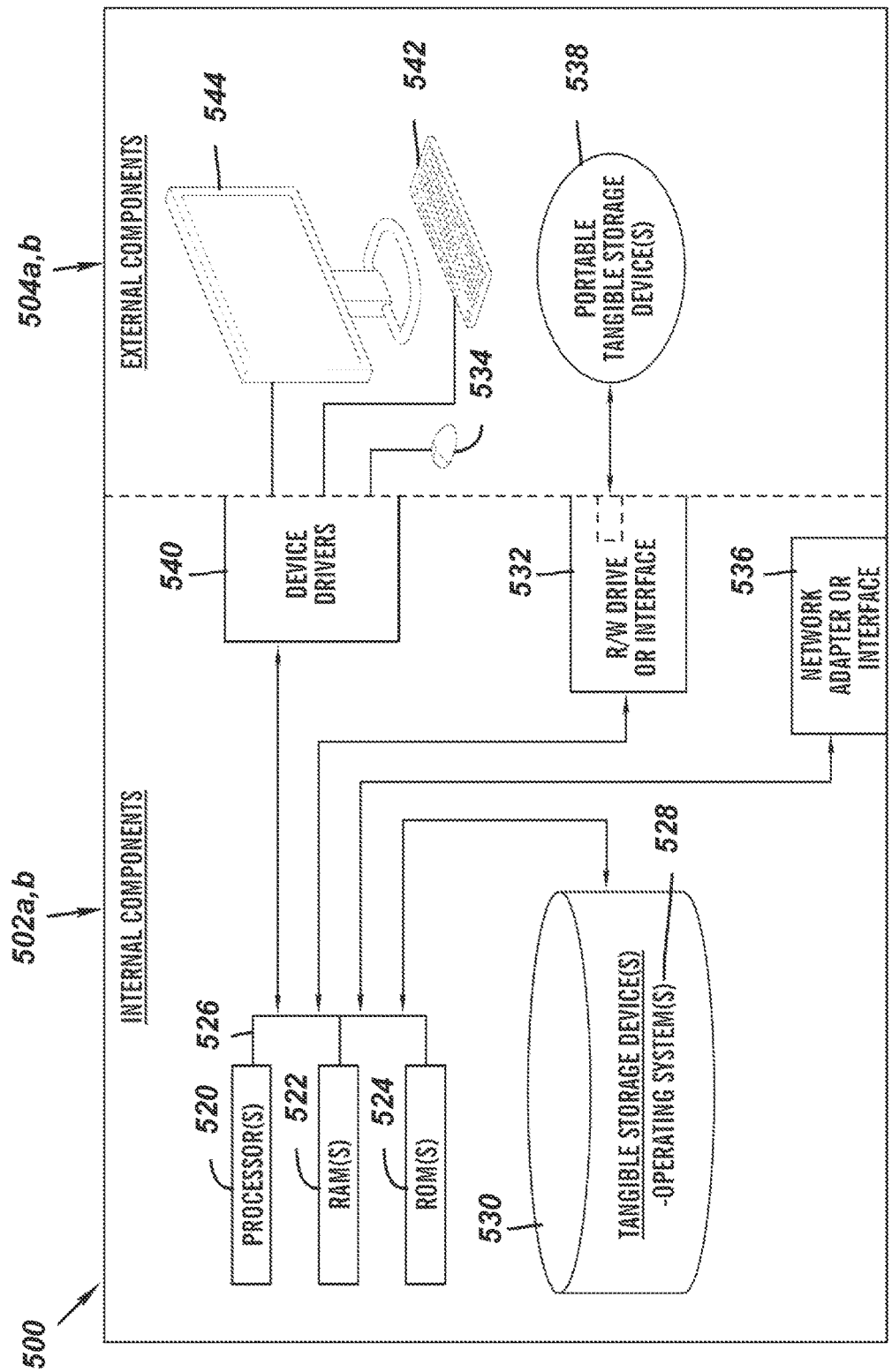
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may be represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the camera management program 110A in the client computing device 102, and the camera management program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the camera management program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the camera management program 110A in the client computing device 102 and the camera management program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the camera management program 110A in the client computing device 102 and the camera management program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices.

Each of the sets of internal components 502 a,b also includes device drivers 540 to interface to computer display monitor 544, keyboard 542, and computer mouse 534. The device drivers 540, RAY drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
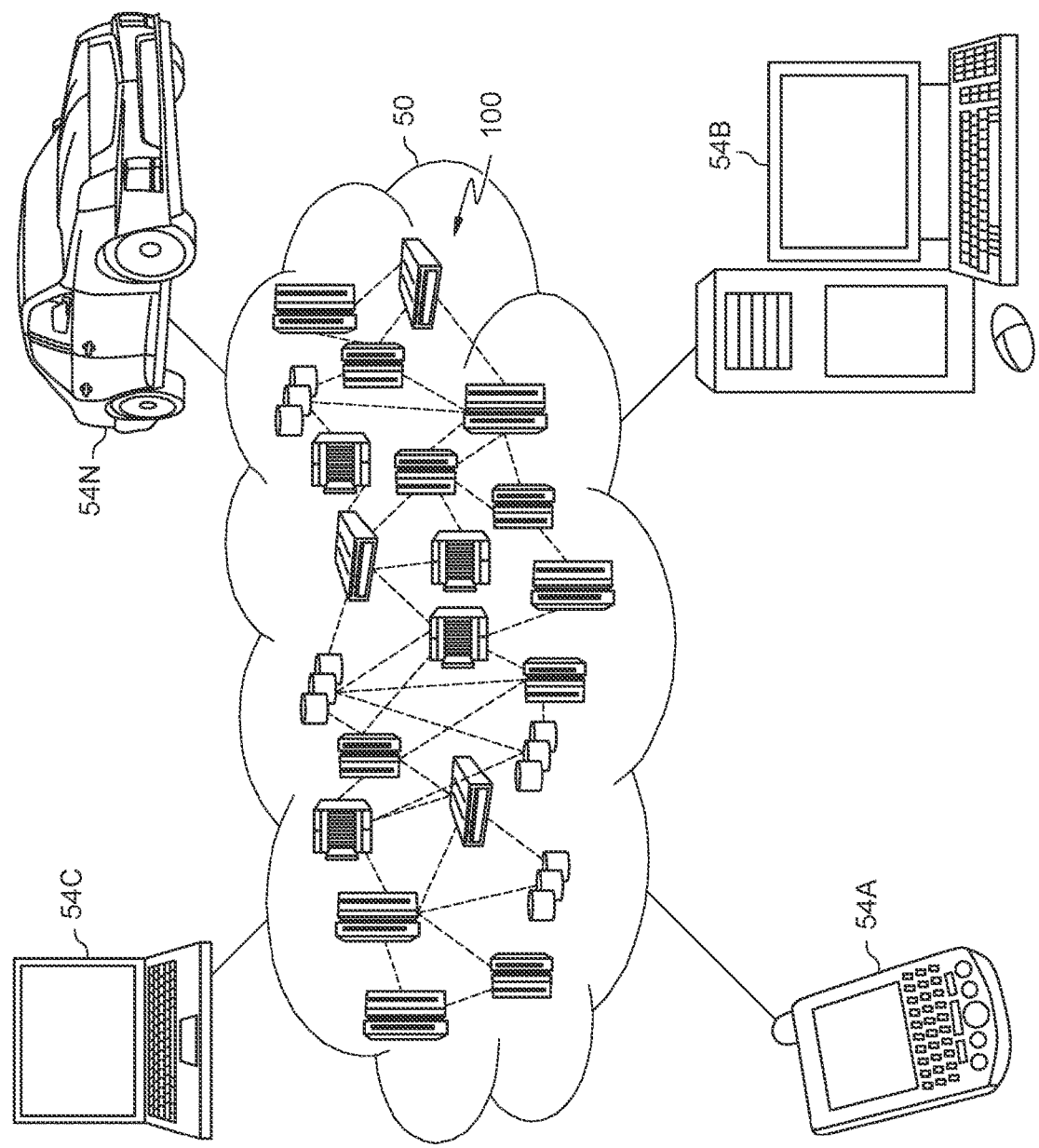
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
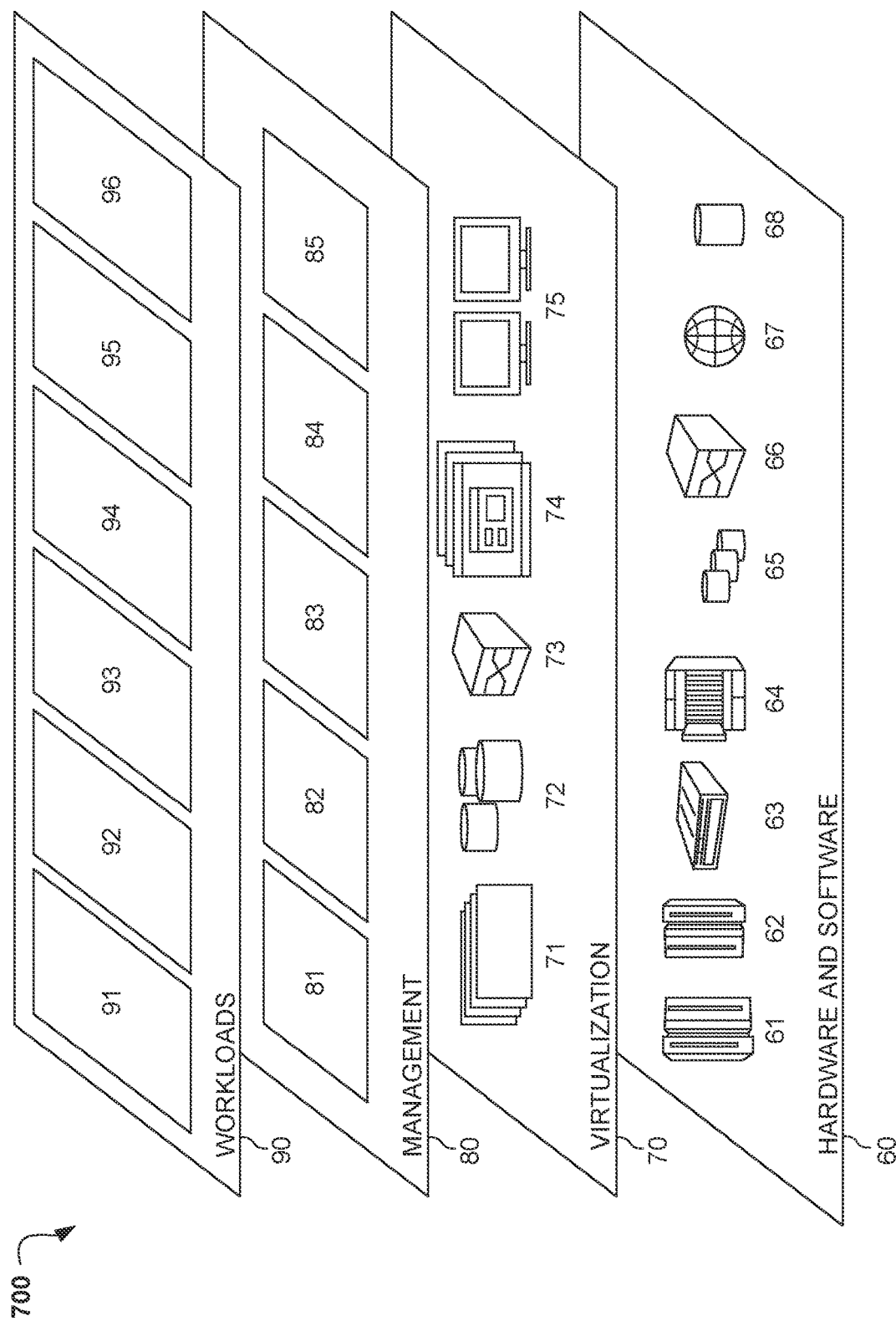
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and camera management 96. The camera management 96 may be enabled to dynamically monitor and adapt to the bend profile and holding pattern of a flexible device to maintain coverage of integrated cameras.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for operating a flexible device to visually capture a target area, the method comprising:
    based on a bending profile and a holding pattern of a flexible device, individually aligning one or more cameras of the flexible device to visually capture the target area.

2. The method of claim 1, further comprising:
    identifying at least one compromised camera of the one or more cameras.

3. The method of claim 2, wherein identifying at least one compromised camera of the one or more cameras further comprises:
determining that a visual quality associated with the one or more cameras falls below a threshold level of visual quality.

4. The method of claim 2, further comprising:
responsive to the identifying, recommending a new holding pattern or new bending profile to the user.

5. The method of claim 2, further comprising:
disabling the at least one compromised camera.

6. The method of claim 1, wherein the flexible device comprises a plurality of cameras and wherein the aligning further comprises:
coordinating at least two of the cameras to visually capture the target area.

7. The method of claim 1, wherein the one or more cameras of the flexible device are manipulable by one or more microfluidics surfaces.

8. A computer system for operating a flexible device to visually capture a target area, the computer system comprising:
one or more processors, one or more computer-readable memories, one or more computer-readable tangible storage medium, one or more flexible devices equipped with at least one camera, and program instructions stored on at least one of the one or more tangible storage medium for execution by at least one of the one or more processors via at least one of the one or more memories, wherein the computer system is capable of performing a method comprising:
based on a bending profile and a holding pattern of the flexible device, individually aligning the one or more cameras of the flexible device to visually capture the target area.

9. The computer system of claim 8, further comprising:
identifying at least one compromised camera of the one or more cameras.

10. The computer system of claim 9, wherein identifying at least one compromised camera of the one or more cameras further comprises:
determining that a visual quality associated with the one or more cameras falls below a threshold level of visual quality.

11. The computer system of claim 9, further comprising:
responsive to the identifying, recommending a new holding pattern or new bending profile to the user.

12. The computer system of claim 9, further comprising:
disabling the at least one compromised camera.

13. The computer system of claim 8, wherein the flexible device comprises a plurality of cameras and wherein the aligning further comprises:
coordinating at least two of the cameras to visually capture the target area.

14. The computer system of claim 8, wherein the one or more cameras of the flexible device are manipulable by one or more microfluidics surfaces.

15. A computer program product for operating a flexible device to visually capture a target area, the computer program product comprising:
one or more computer-readable tangible storage medium and program instructions stored on at least one of the one or more tangible storage medium, the program instructions executable by a processor to cause the processor to perform a method comprising:
based on a bending profile and a holding pattern of a flexible device, individually aligning one or more cameras of the flexible device to visually capture the target area.

16. The computer program product of claim 15, further comprising:
identifying at least one compromised camera of the one or more cameras.

17. The computer program product of claim 16, wherein identifying at least one compromised camera of the one or more cameras further comprises:
determining that a visual quality associated with the one or more cameras falls below a threshold level of visual quality.

18. The computer program product of claim 16, further comprising:
responsive to the identifying, recommending a new holding pattern or new bending profile to the user.

19. The computer program product of claim 16, further comprising:
disabling the at least one compromised camera.

20. The computer program product of claim 15, wherein the flexible device comprises a plurality of cameras and wherein the aligning further comprises:
coordinating at least two of the cameras to visually capture the target area.

* * * * *